United States Patent [19]

Brown

[11] Patent Number: 5,046,379
[45] Date of Patent: * Sep. 10, 1991

[54] REMOTE CONTROL APPARATUS

[76] Inventor: William L. Brown, 17373 Roxbury, Southfield, Mich. 48075

[*] Notice: The portion of the term of this patent subsequent to Sep. 16, 2003 has been disclaimed.

[21] Appl. No.: 867,045

[22] Filed: May 27, 1986

Related U.S. Application Data

[63] Continuation of Ser. No. 799,287, Nov. 20, 1985, Pat. No. 4,611,501, which is a continuation of Ser. No. 459,512, Jan. 20, 1983, abandoned.

[51] Int. Cl.$^5$ .................. F16C 1/10; F16H 1/18; G02B 5/08
[52] U.S. Cl. .................. 74/502.1; 74/424.8 A
[58] Field of Search .......... 74/424.8 A, 424.8 C, 74/458, 459, 479, 501 M, 661; 248/481, 483; 350/634

[56] References Cited

U.S. PATENT DOCUMENTS

| | | | |
|---|---|---|---|
| 2,611,280 | 9/1952 | Brinkhurst | 74/424.8 A |
| 3,128,634 | 4/1964 | Eastman | 74/424.8 C |
| 3,214,991 | 11/1965 | Perrin | 74/424.8 C |
| 3,609,014 | 9/1971 | Kurz | 350/289 |
| 3,744,332 | 7/1973 | Nilsson | 74/424.8 C |
| 4,041,793 | 8/1977 | Repay et al. | 74/424.8 R |
| 4,074,463 | 2/1978 | Colanzi | 74/89.15 X |
| 4,074,587 | 2/1978 | Brusasco | 74/424.8 R |
| 4,089,233 | 5/1978 | Sebald | 74/424.8 A |
| 4,210,033 | 7/1980 | Erikson et al. | 74/424.8 A |
| 4,362,362 | 12/1982 | Usami et al. | 350/289 |

FOREIGN PATENT DOCUMENTS

| | | | |
|---|---|---|---|
| 83239 | 7/1978 | Japan | 350/634 |
| 114139 | 10/1978 | Japan | 350/634 |
| 126642 | 11/1978 | Japan | 350/634 |
| 3742 | 1/1979 | Japan | 350/634 |

*Primary Examiner*—Dwight Diehl
*Attorney, Agent, or Firm*—Marshall, O'Toole, Gerstein, Murray & Bicknell

[57] ABSTRACT

Apparatus enabling a vehicle operator to remotely control the positioning of an object, such as a rear view mirror, pivotally mounted on the exterior of the vehicle. The apparatus includes a support member for the object to the positioned, a base member attached to the vehicle exterior and a ball and socket joint connecting the support member to the base member. There are a pair of linkages, each including a helical spring extending between the base member and the support member. Each linkage is actuable to pivot the support member about a respective one of two mutually transverse pivotal axes. Each linkage is driven by a reversible motor operated by a four position switch inside the vehicle.

2 Claims, 3 Drawing Sheets

REMOTE CONTROL APPARATUS

RELATED APPLICATIONS

This is a continuation of application Ser. No. 799,287 filed Nov. 20, 1985, now U.S. Pat. No. 4,611,501, in turn a continuation of application Ser. No. 459,512 filed Jan. 20, 1983 and now abandoned.

BACKGROUND OF THE INVENTION

The present invention relates generally to remote control apparatuses and more particularly to an apparatus which enables the operator of a vehicle to remotely control the positioning of an object, such as a rear view mirror or a spotlight, mounted on the exterior of the vehicle.

In a typical remote control apparatus of the general type to which the present invention relates, the object to be remotely controlled, such as a rear view mirror, is mounted on a support member which in turn is pivotally mounted, as by a ball and socket arrangement, on a base member or housing which in turn is mounted on either the left side or right side of the vehicle (typically an automobile or truck). The mirror support member is mounted for pivotal movement, relative to the base member, about a pair of mutually transverse pivotal axes, e.g., a vertical axis and a horizontal axis.

Extending between the base member and the support member are a pair of linkages each comprising structure actuable to pivot the support member about a respective one of its two pivotal axes. Each linkage is connected to the support member at a position radially spaced from the main pivot point of the support member, and each connection between a linkage and the support member is angularly spaced 90° from the other connection.

Mounted on the base member are a pair of reversible driving motors each for actuating one of the linkages. The driving motors are controlled by a single four-position switch accessible to the vehicle operator. This switch may be moved back and forth in a first pair of opposed directions to pivot the support member about one of its pivotal axes, and the switch may be moved back and forth in a second pair of opposed directions, transverse to the first pair, to pivot the support member about the other of its pivotal axes.

The connection between each linkage and the support member must accommodate pivotal movement of the support member about both of its mutually transverse pivotal axes. In the prior art this has been accomplished by providing a ball and socket joint at each connection between a linkage and the support member. Typically, the linkage included an externally threaded member connected to a ball and socket joint at the support member and driven by an internally threaded member in turn driven by a gear train connected to a motor. All of the linkage described in the preceding sentence was mounted on the base member, and the resulting package was relatively large. Moreover, it was relatively expensive to use a ball and socket joint for connecting each of the linkages to the support member. In addition, the fit of the ball within the socket necessarily was not too tight, and there was play between the ball and the socket. As a result, during movement of the vehicle along a highway, for example, the support member and attached mirror vibrated relative to the base member.

A remote control apparatus of the type described above is disclosed in Kurz, U.S. Pat. No. 3,609,014 issued Sept. 28, 1971 and entitled "Electric Remote Control Rear View Mirror".

SUMMARY OF THE INVENTION

The drawbacks and deficiencies of the prior art apparatuses of the type described above are eliminated by a remote control apparatus in accordance with the present invention.

The linkage of the present invention employs a helical spring extending between the base member and the support member. This helical spring has a longitudinal axis and a terminal end engaging the support member. The helical spring is mounted for axial movement relative to the base member to pivot the support member about one of its pivotal axes. Because the helical spring is resilient, it bends elastically in response to pivotal movement of the support member about either of its pivotal axes, thereby accommodating the pivotal movement of the support member.

The mechanical structure which moves the helical spring in an axial direction comprises a bushing element having an axis of rotation corresponding to the axis of the helical spring and an internal axial opening within which the helical spring extends. The bushing element is seated on the base member and mounted thereon for rotation about its axis. There is an externally threaded member (e.g., a set screw) having an axis parallel to the axis of the helical spring and mounted on the bushing element so that the externally threaded member revolves about the axis of the bushing element in response to axial rotation of the bushing element.

The helical spring has a plurality of laps defining external threading around the periphery of the helical spring. The externally threaded member extends into the internal axial opening of the bushing element to engage the external threading on the helical spring to move the helical spring axially in response to revolving movement by the externally threaded member.

The present invention eliminates the relatively expensive ball and socket joint utilized with each of the two linkages by the prior art and, instead, employs helical springs and set screws which are shelf items and are relatively inexpensive.

Another advantage of the present invention is that the helical spring acts as a vibration dampener to reduce vibration by the support member relative to the base member.

Other features and advantages are inherent in the structure claimed and disclosed or will become apparent to those skilled in the art from the following detailed description in conjunction with the accompanying diagrammatic drawings.

DETAILED DESCRIPTION

Figure 1:
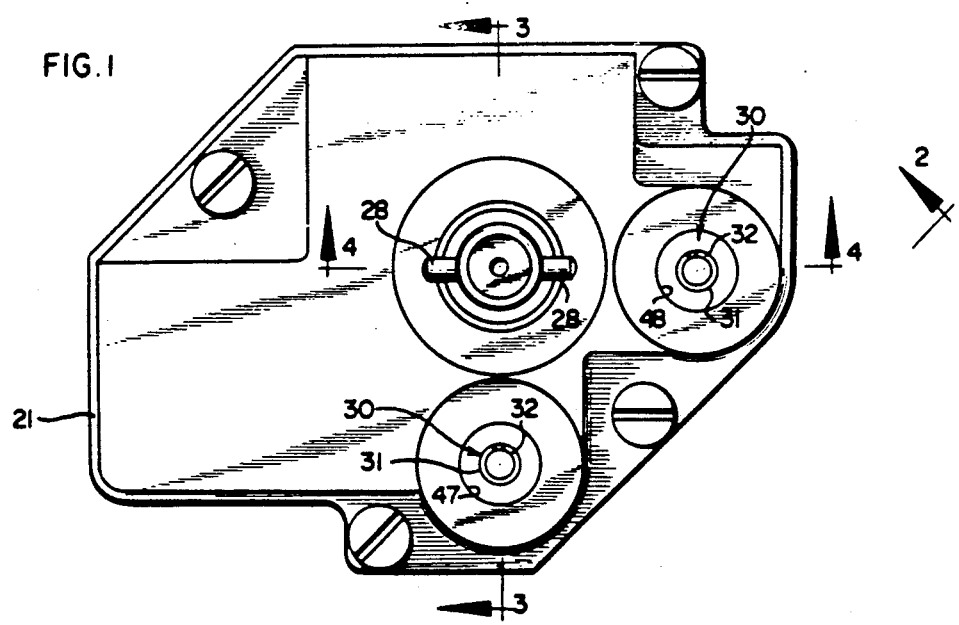
FIG. 1 is a plan view of a remote control apparatus in accordance with an embodiment of the present invention, with the support member removed.
Figure 2:
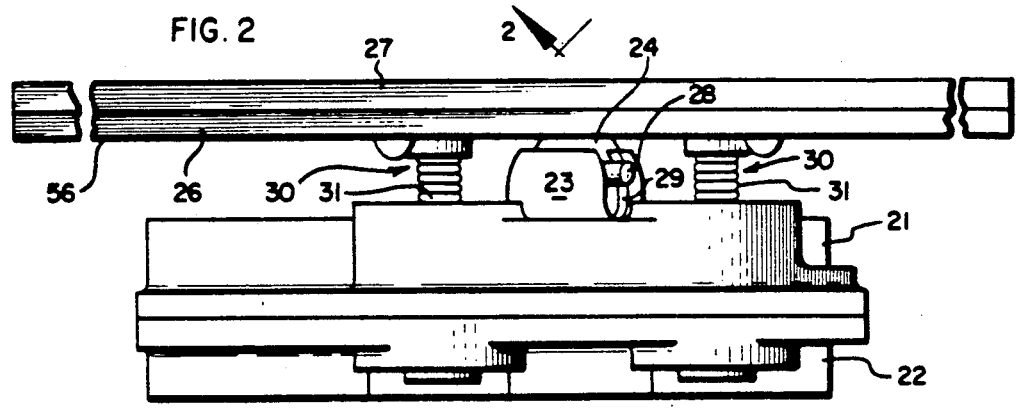
FIG. 2 is a side elevational view taken along line 2—2 in FIG. 1 and with the support member in place.

Referring initially to FIGS. 1-5, there is illustrated an embodiment of a remote control apparatus in accordance with the present invention and comprising a base member or housing having first and second housing portions 21, 22 respectively. The two housing portions are detachably connected with conventional fasteners such as screws (not shown). Integral with first housing portion 21 is a socket 23 within which is rotatably mounted a ball 24 secured by a screw 25 to a second or support member 26 in turn supporting a mirror 27. The housing is mounted in a conventional manner on the side of an automobile or similar vehicle, employing conventional mounting structure (not shown). When so mounted on the side of a vehicle, support member 26 and mirror 27 would be in a vertical disposition rather than in the horizontal disposition shown in the drawings as a matter of convenience of illustration.

Figure 3:
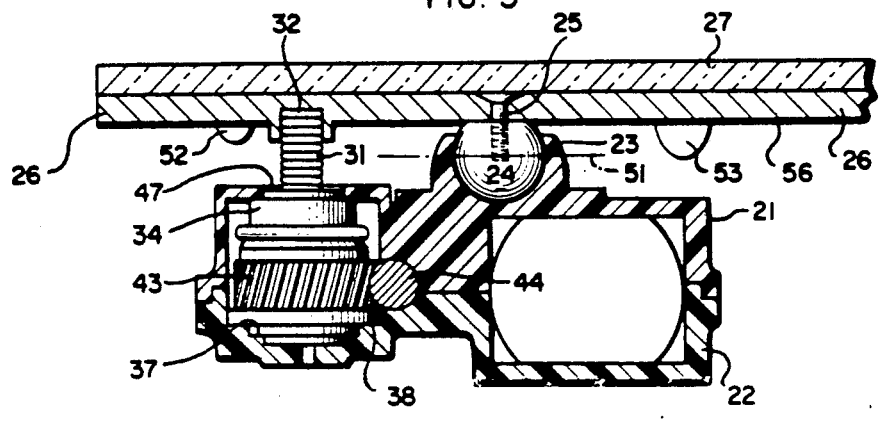
FIG. 3 is a sectional view taken along line 3—3 in FIG. 1 and with the support member in place.
Figure 4:
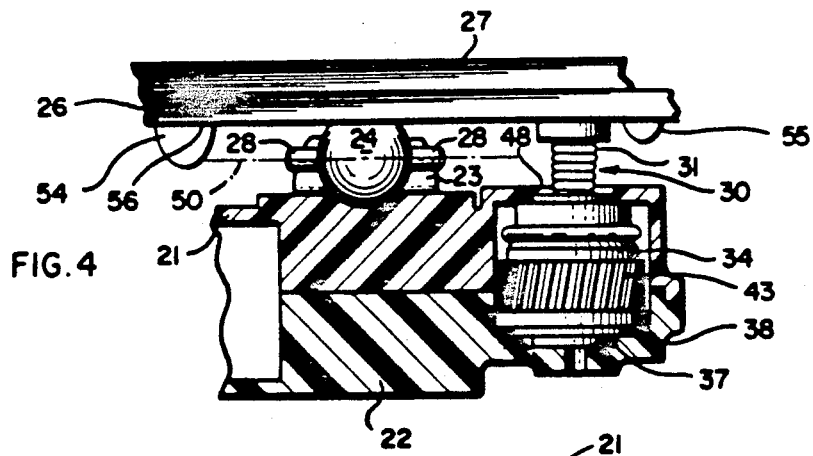
FIG. 4 is a sectional view taken along line 4—4 in FIG. 1 and with the support member in place.
Figure 5:
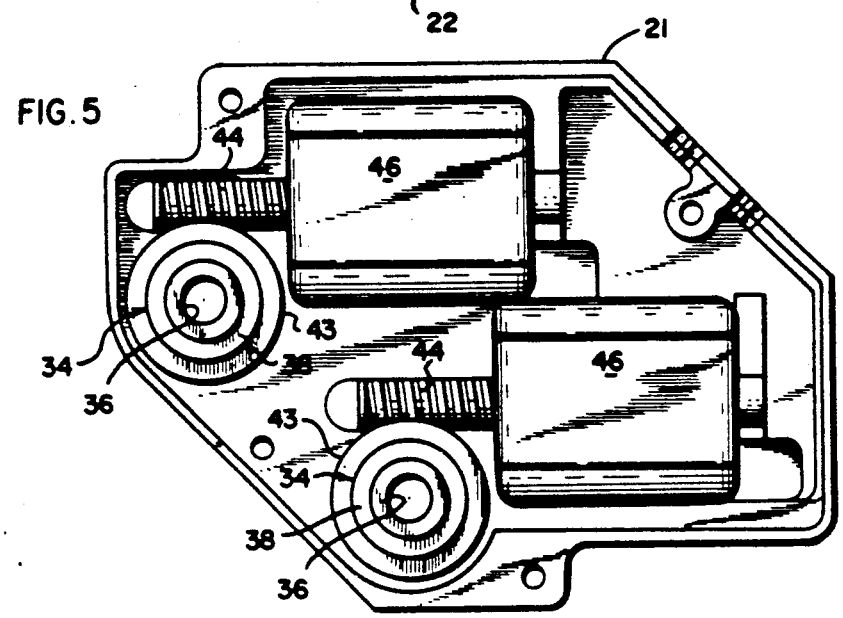
FIG. 5 is a bottom view of the apparatus.

Extending in opposite directions from ball 24 are a pair of pins 28, 28 each rotatably and tiltably received in a respective slot 29, 29 on socket 23. Ball and socket joint 23, 24 and the pins 28, 28 and slots 29, 29 mount support member 26 for pivotal movement, relative to housing 21, 22 about a pair of mutually transverse pivotal axis 50, 51 (FIGS. 3 and 4). Pivotal axis 50 corresponds to the axis of pins 28, 28, and pivotal axis 51 is perpendicular to axis 50.

Support member 26 is caused to pivot about the two pivotal axes 50, 51 by a pair of linkages 30, 30 each spaced radially from ball and socket joint 23, 24 and angularly spaced from each other by an angle of 90°. Referring to FIGS. 3-4 and 8-9, each linkage 30 comprises a helical spring 31 extending between housing 21, 22 and support member 26. The two helical springs extend through respective openings 47, 48 in the housing. Each helical spring 31 has a longitudinal axis and an outer terminal end 32 fixedly secured to support member 26 (FIG. 3), as by pressing. Axial movement of helical spring 31 causes support member 26 to be pivoted about one of its pivotal axes, and structure which mounts helical spring 31 for axial movement will now be described.

Indicated at 34 is a bushing element having an exterior 35 and an internal axial opening 36 within which helical spring 31 extends. Housing portion 22 includes a stepped part 37 on which is seated a correspondingly stepped part 38 on bushing element 34. Bushing element 34 has an axis of rotation corresponding to the axis of helical spring 31, and the seating of the bushing element's stepped part 38 on stepped part 37 of housing portion 22 mounts bushing element 34 for rotation about this axis.

Bushing element 34 has a radially extending slot 39 having an inner open end at the bushing element's internal axial opening 36 and an outer end at the bushing element's exterior 35. Received within radial slot 39 is an externally threaded member or set screw 40 having an axis parallel to the axis of helical spring 31. Set screw 40 is separate and discrete from bushing element 34 and is non-integral therewith. Disposed around the outside of bushing element 34 at slot 39 is a springable, split-ring retainer 41 which retains set screw 40 in slot 39. Retainer ring 41 is composed of springable or resilient material. The structure described in the preceding portion of this paragraph mounts set screw 40 for revolving movement about the axis of bushing element 34 in response to rotation of the bushing element about its axis.

Helical spring 31 has a plurality of laps 33, 33 defining external threading around the periphery of the helical spring. Retainer 41 normally urges set screw 40 radially inwardly in slot 39 so that the threads on set screw 40 normally engage the external threading 33 on helical spring 31. The pitch on the threads of set screw 40 is opposite to the pitch on the external threading 33 of helical spring 31. Revolving movement of set screw 40 about the axis of bushing element 34, while the threads on set screw 40 are engaged with external threading 33 on helical spring 31, causes axial movement by the helical spring.

Integral with exterior 35 of bushing element 34 is a worm gear 43 driven by a worm 44 mounted on the shaft 45 of a reversible electric motor 46. Bushing element 34 is thus rotated by actuating electric motor 46. As noted above, the rotation of bushing element 34 causes set screw 40 to revolve about the axis of the bushing element, in turn moving helical spring 31 axially out of or into internal axial opening 36 of bushing element 34. Axial movement of helical spring 31 in turn causes pivotal movement of support member 26 about one of its pivotal axes.

Helical spring 31 moves axially out of or into the bushing element's internal axial opening 36 depending upon the sense in which set screw 40 revolves about the axis of bushing element 34. The bushing element is mounted for rotation on the stepped part 37 of housing portion 22 in both clockwise and counterclockwise senses. Similarly, set screw 40 is mounted for revolving movement about the axis of bushing element 34, in either a clockwise or a counterclockwise sense, depending upon the sense in which bushing element 34 is rotated. More specifically, rotation of bushing element 34 in a clockwise sense about its axis causes set screw 40 to revolve about the axis of bushing element 34 in a clockwise sense, and rotation of bushing element 34 in a counterclockwise sense causes set screw 40 to revolve in a counterclockwise sense.

As noted above, support member 26 is mounted by ball and socket 23, 24 for pivotal movement about a pair of mutually transverse pivotal axes 50, 51. Axial movement of the helical spring 31 illustrated in FIG. 3 causes support member 26 to pivotal about axis 50 (FIG. 4), while axial movement of the helical spring 31 shown in FIG. 4 causes support member 26 to pivot about the axis 51 (FIG. 3).

Each helical spring 31 is composed of resilient material, such as spring steel, which permits elastic bending of the helical spring in response to pivotal movement of support member 26 about either of its pivotal axes 50, 51. When support member 26 pivots about pivotal axis 50, in response to axial movement by the helical spring 31 shown in FIG. 3, that helical spring bends in a plane perpendicular to pivotal axis 50. On the other hand, when support member 26 is pivoted about its other axis 51, in response to axial movement of the helical spring 31 illustrated in FIG. 4, the helical spring 31 illustrated in FIG. 3 bends in a plane parallel to pivotal axis 50 (but perpendicular to pivotal axis 51).

A similar bending movement occurs on the part of the helical spring 31 illustrated in FIG. 4. More particularly, when support member 26 is pivoted about its other pivotal axis 51, in response to axial movement of the helical spring 31 illustrated in FIG. 4, that helical spring bends in a plane perpendicular to pivotal axis 51. On the other hand, when support member 26 is pivoted about pivotal axis 50, in response to axial movement of the helical spring 31 illustrated in FIG. 3, the helical spring 31 illustrated in FIG. 4 bends in a plane perpendicular to axis 50 but parallel to axis 51.

(In the above description, where the helical spring is described as bending in a plane, it is only the axis or center line of the helical spring which bends in a true geometric plane. The helical spring is, of course, three dimensional and is thus not capable of literally bending in a true geometric plane but, rather, bends in a multiplicity of planes parallel to the plane in which the helical spring's axis or center line bends.)

As shown in the drawings, helical spring 31 has a substantially uniform diameter along its entire length between housing 21, 22 and support member 26. Terminal end 32 of helical spring 31 is directly connected to support member 26 without any intervening mechanical linkage to accommodate the pivotal movement of support member 26. The elastic bending properties of the helical spring constitutes substantially the sole provision for accommodating the pivotal movement of support member 26.

Radial slot 39 has a width, measured in a direction transverse to the axis of externally threaded member 40, which tapers from the outer open end of the slot to the inner open end of the slot. Slot 39 is wider than the diameter of set screw 40, at the outer open end of the slot, to permit insertion of set screw 40 into slot 39. The slot is narrower than the diameter of set screw 40, at the inner open end of the slot, to prevent set screw 40 from falling into internal axial opening 36 of bushing element 34. Split retainer ring 41 engages that portion of set screw 40 which is radially outermost in slot 39 toward internal axial opening 36 in bushing element 34.

Slot 39 mounts set screw 40 for movement within the slot in a radial direction relative to the bushing element, and retainer ring 41 normally urges the set screw radially inwardly in slot 39 for engagement with the external threading 33 on helical spring 31.

The arrangement described in the preceding paragraph accommodates manual adjustment of support member 26, which may be performed when driving motors 46, 46 and their associated linkages are not operating.

More particularly, support member 26 may be manually grasped and manipulated to pivot about one or both of its pivotal axes. When this occurs, the helical spring 31 which normally moves axially to pivot the support member, during remote controlled operation, is itself urged, by the manually pivoted support member, to move axially within internal axial opening 36 of bushing element 34. As noted above, the external threads on set screw 40 are normally urged by retainer ring 41 into engagement with the external threading 33 on helical spring 31, and this would normally impede axial movement of helical spring 31 in the absence of revolving movement by the set screw. Nevertheless, axial movement of helical spring 31 urges the non-revolving set screw outwardly in radial slot 39 against the urging of split retainer ring 41, and because ring 41 is a resilient member, it yields and permits set screw 40 to move radially outwardly. This removes any impediment to axial movement by helical spring 41 in the absence of revolving movement by the set screw 40, thereby accommodating manual adjustment of support member 26.

The yieldable nature of retainer ring 41 also accommodates a situation in which (a) helical spring 31 is restrained against axial movement (e.g., when the apparatus includes stop means for restraining such movement beyond a predetermined limit) and (b) set screw 40 is revolving about the helical spring. In such a situation, opposite forces are acting against the helical spring. However, the yieldable nature of retainer ring 41 permits set screw 40 to move radially outwardly in slot 39, thereby at least partially removing one of the opposing forces acting against the helical spring.

When a helical spring 31 is restrained against further axial movement, but its corresponding set screw 40 is still undergoing revolving movement about the axis of helical spring 31, there is an increase in torque experienced by the motor 46 driving that set screw. Preferably, motor 46 is provided with a torque-responsive device which stops the motor when this occurs.

Figure 6:
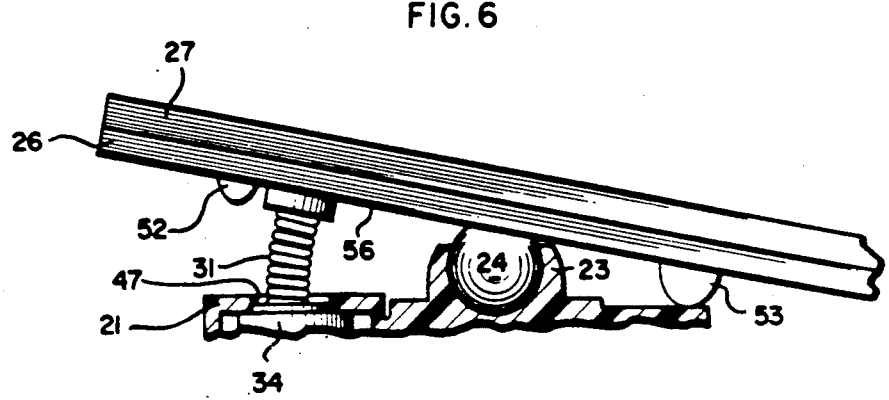
FIG. 6 is a fragmentary, sectional view of the apparatus showing the support member pivoted along one axis in a first sense.
Figure 7:
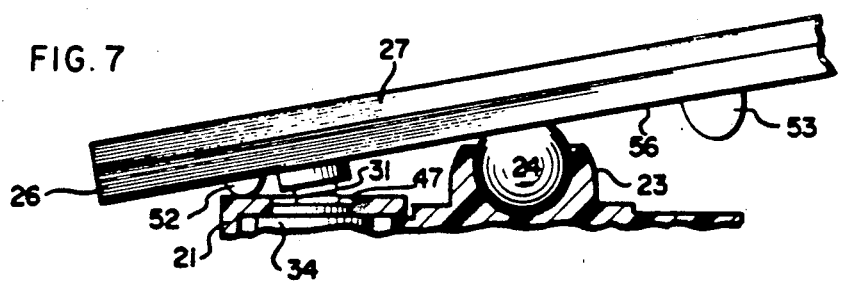
FIG. 7 is a fragmentary, sectional view, similar to FIG. 6, showing the support member pivoted along the one axis in a second sense, opposite the first sense.
Figure 8:
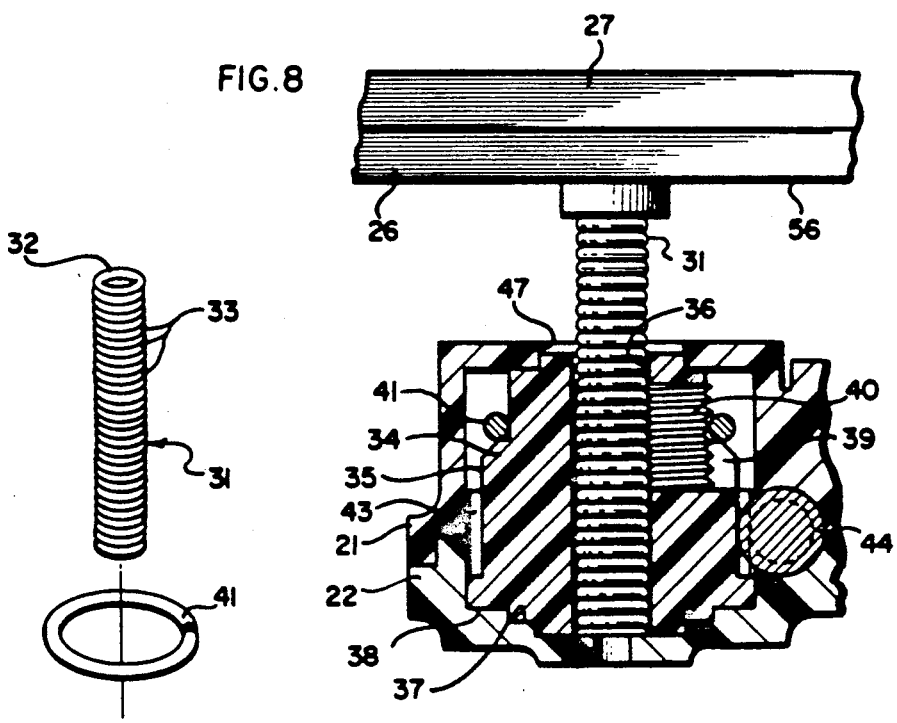
FIG. 8 is a fragmentary, sectional view of the linkage employed in the apparatus.
Figure 9:
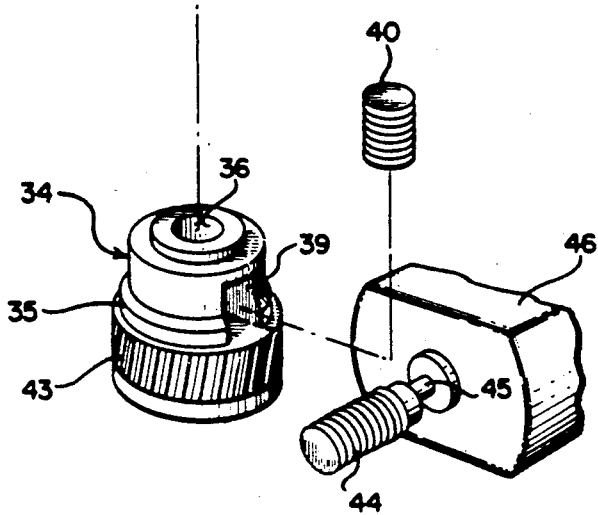
FIG. 9 is an exploded perspective of the linkage.

As shown in FIGS. 3, 6 and 7, located at the rear surface 56 of support member 26 are a pair of stops 52, 53 for limiting pivotal movement of the support member about axis 50 of ball and socket joint 23, 24 (FIG. 4). Similarly, as shown in FIG. 4, also located on rear surface 56 of support member 26 are another pair of stops 54, 55 for restricting pivotal movement of the support member about axis 51 on the ball and socket joint (FIG. 3). Typically, pivotal movement is limited to about 12° about each axis 50, 51 so as to define a pivotal cone of about 12° for the ball and socket joint and support member 26. Each of the stops 52, 53 or 54, 55 abuts against an adjacent surface of first housing portion 21 to limit pivotal movement of support member 26.

Referring to FIGS. 6 and 7, when stop 53 abuts against first housing portion 21, this prevents further movement of the helical spring 31 shown in those figures in an axially outward direction relative to the corresponding bushing element 34. Similarly, when stop 52 abuts against first housing portion 21, this limits further movement of the helical spring 31 shown in those figures in an axially inward direction relative to its bushing element 34.

Similar restraints against axial movement occur with respect to the helical spring 31 shown in FIG. 4 when the stops 54, 55 abut against first housing portion 21. More particularly, when stop 55 abuts against first housing portion 21, this restrains further inward axial movement of the helical spring 31 shown in FIG. 4, and when stop 54 abuts against first housing portion 21, this restrains further outward axial movement of the helical spring 31 shown in FIG. 4. The helical spring 31 shown in FIG. 4 is angularly spaced 90° from the helical spring 31 shown in FIG. 3.

Helical springs 31, 31, set screws 40, 40 and retainer rings 41, 41 are shelf items which are readily available commercially and substantially reduce the cost of the linkages 30, 30 of an apparatus in accordance with the present invention, compared to an apparatus employing ball and socket joints at the same locations.

As previously noted, housing 21, 22 is rigidly mounted by conventional structure on the side of a vehicle such as an automobile which is driven across a highway and the like. If there is vibration by support member 26 and mirror 27, relative to the housing and vehicle, while the vehicle is being driven, the vibration will interfere with the proper functioning of the mirror.

Helical springs 31, 31 function as vibration dampeners which substantially reduce vibration on the part of support member 26 relative to housing 21, 22.

The foregoing detailed description has been given for clearness of understanding only, and no unnecessary limitations should be understood therefrom, as modifications will be obvious to those skilled in the art.

I claim:

1. In combination:
   a bushing element having an axis of rotation and comprising an exterior and an internal axial opening;
   worm gear means around said exterior of the bushing element;
   a radial slot extending between said internal axial opening and said exterior and defining an opening in said exterior;
   an externally threaded member having an axis parallel to the axis of said bushing and received within said radial slot;
   said externally threaded member being separate and discrete from said bushing element and non-integral therewith;
   means, comprising said radial slot, mounting said externally threaded member for revolving movement about the axis of said bushing element in response to axial rotation of said bushing element;
   and means, located at the exterior of said bushing element, normally urging said externally threaded member radially inwardly in said slot toward said internal axial opening in the bushing element.

2. In combination:
   a bushing element having an axis of rotation and comprising an exterior and an internal axial opening;
   a radial slot extending between said internal axial opening and said exterior and defining an opening in said exterior;
   an externally threaded member having an axis parallel to the axis of said bushing and received within said radial slot;
   said externally threaded member being separate and discrete from said bushing element and non-integral therewith;
   means, comprising said radial slot, mounting said externally threaded member for revolving movement about the axis of said bushing element in response to axial rotation of said bushing element;
   and means, located at the exterior of said bushing element, normally urging said externally threaded member radially inwardly in said slot toward said internal axial opening in the bushing element;
   said urging means comprising springable, split-ring retainer means disposed around the outside of said bushing element at said slot.

* * * * *